United States Patent Office

3,445,447
Patented May 20, 1969

3,445,447
TERT-AMYLOXYCARBONYL DERIVATIVES
OF AMINO ACIDS
Shumpei Sakakibara, Hyogo-ken, Japan, assignor, by direct and mesne assignments, of one-half each to Ajinomoto Co., Inc., Tokyo, and Tanabe Seiyaku Co., Ltd., Osaka-shi, Japan
No Drawing. Filed Jan. 27, 1966, Ser. No. 523,283
Claims priority, application Japan, Feb. 4, 1965, 40/6,213; Nov. 29, 1965, 40/73,522
Int. Cl. C07c *117/02, 103/52, 135/00*
U.S. Cl. 260—112.5                                   6 Claims

ABSTRACT OF THE DISCLOSURE

The amino group of amino acids and their esters may be protected for later formation of peptides by reaction with tert-amyloxycarbonyl azide which is readily prepared from tert-amyloxycarbonyl chloride, and the latter compound may be employed directly in the reaction with the esters. The tert-amyloxy reagents are more stable and can be prepared in better yields than the known corresponding butoxycarbonyl derivatives whose advantages they share.

---

This invention relates to intermediates in the synthesis of peptides, and particularly to amino acids and derivatives thereof whose amino group is protected by acylation.

It is generally necessary in peptide synthesis from amino acids or their derivatives to protect the amino or imino groups which are not intended to participate in a reaction. N-acylation is commonly used, and the introduction of a carbobenzoxyl group or of a tert-butoxycarbonyl group was preferred prior to this invention. Carbobenzoxyl chloride is readily obtained from benzyl alcohol and phosgene at low temperatures and reacts with the amino or imino groups to be protected. The carbobenzoxyl group, however, can be removed only by catalytic hydrogenation, hydrogenation with metallic sodium in liquid ammonia, treatment with anhydrous hydrogen bromide, or treatment with hot trifluoroacetic acid after performing its function. It reacts with cold trifluoroacetic acid, with hydrogen chloride and other relatively mild reagents at rates too low to be practical.

The tert-butoxycarbonyl group, on the other hand, is readily removed from a protected amino or imino group but it can be introduced only by the use of reagents which are prepared by relatively difficult procedures. The tert-butyl chloroformate, analogous to carbobenzoxyl chloride, is unstable at temperatures above 10° C. and is catalytically decomposed at even lower temperatures by water or amines inherently present when it is attempted to react tert-butyl chloroformate with an amino acid or its derivative having an amino or imino group. Tert-butyl azidoformate, tert-butyl p-nitrophenyl carbonate and tert-butyl cyanoformate have, therefore, been employed for introducing the tert-butoxycarbonyl group into amino acids although they react rather slowly. Because of the low yields of the known multi-step processes for preparing these more complex reagents from tert-butanol, they are accessible only at relatively high cost and are not practical for use on an industrial scale.

I have now found that tert-amyl alcohol can be reacted with phosgene in the manner of benzyl alcohol to produce tert-amyl chloroformate or tert-amyloxycarbonyl chloride which is stable in the presence of amino groups and can be reacted directly and quickly with amino acid esters or their derivatives having amino or imino groups to form the corresponding tert-amyloxycarbonyl derivatives in which the amino or imino radical is protected. These acyl derivatives are readily converted again to the free amino or imino groups in the same manner as the tert-butoxycarbonyl derivatives.

Tert-amyloxycarbonyl chloride thus combines the ready availability, stability in the presence of amines, and high reactivity of carbobenzoxy chloride, not possessed by the corresponding tert-butoxycarbonyl chloride, with the advantages of the costly, stable, but much less reactive derivatives of tert-butanol employed heretofore for introducing an N-butoxycarbonyl group into amino acids or their derivatives.

Tert-amyloxycarbonyl chloride (tert-amyl chloroformate) must be stored under refrigeration since it decomposes spontaneously at temperatures above −20° C. Moreover, it cannot be reacted directly with free amino acids. The acid must be present in the reaction mixture in the form of an ester. Tert-amyloxycarbonyl chloride is readily converted with excellent yields to the corresponding tert-amyloxycarbonyl azide which is free of these limitations of the parent substance.

The tert-amyloxycarbonyl derivatives of amino acids prepared according to the instant invention share all the desirable features of the known tert-butoxycarbonyl derivatives. They are not decomposed by hydrogenation but are readily split by trifluoroacetic acid, hydrogen chloride or hydrogen bromide in the cold, thereby permitting selective removal of one N-acyl group in an amino acid derivative having one amino group protected by a tert-amyloxycarbonyl group and another amino group protected by a carbobenzoxyl group. The tert-amyloxycarbonyl group can be introduced into amino acids or peptide components bearing sulfur, such as methionine, which cannot be conveniently protected by carbobenzoxyl groups.

Tert-amyl chloroformate or tert-amyloxycarbonyl chloride is readily formed in very good yields by reaction of tert-amyl alcohol with phosgene in the presence of an acceptor for the hydrogen chloride formed, pyridine having been found to be greatly superior to other HCl-acceptors. The tert-amyloxycarbonyl chloride reacts readily and with practically quantitative yields with esters of amino acids to form the corresponding amino acid derivatives whose amino or imino groups are protected by the tert-amyloxycarbonyl group, hereinafter designated as AOC. The esters may be converted to the free acid by saponification or hydrogenation, or converted to the hydrazides by reaction with hydrazine in a manner known in itself, without loss of the AOC-group.

The reaction between AOC-Cl and amino acid esters proceeds rapidly at temperatures between −30° C. and room temperature, and AOC-Cl is relatively stable at all temperatures below 0° C. although storage over extended periods requires a temperature of −20° C. The compound can be handled safely in large quantities at low temperatures.

AOC-Cl can be used for introducing an N-AOC group into all esters of all amino acids. The wide variety of esters treated successfully with AOC-Cl includes those of the monoaminomonocarboxylic acids, monoaminodicarboxylic acids, diaminomonocarboxylic acids, diaminodicarboxylic acids, and amino acids having a third functional group which may have to be protected in a conventional manner, such as O-benzyl serine, O-tert-butyl threonine, nitroarginine, $N_{Im}$-benzyl histidine, S-benzyl cysteine, and S-methoxybenzyl cystein. The AOC-group is also readily introduced into diaminocarboxylic acid esters having one amino group protected by a different acyl radical, such as the carbobenzoxyl, formyl, phthaloyl, tosyl, or trifluoroacetyl group. The AOC group is readily introduced not only into primary amino groups but also into imino groups, such as those of proline, hydroxyproline and sarcosine.

The alcohol moiety of the amino acid esters reacted with AOC-Cl may be chosen freely to suit the requirements of later synthesis steps. Since the ester usually has to be converted later to the free acid or to the hydrazide, the preferred alcohol moieties are those of the lower alkyl esters, particularly methyl or ethyl, which are readily saponified by means of alkali metal hydroxides and react with hydrazine. The benzyl and p-nitrobenzyl esters also are readily converted to the free acid by hydrogenation in the presence of a catalyst or by means of sodium metal in liquid ammonia. Other alcohol moieties may be chosen where easy deesterification is not of primary importance.

The reaction between AOC-Cl and the amino acid ester is preferably performed in an inert, anhydrous, liquid medium, chloroform, methylene chloride, dimethylformamide, dioxane, and tetrahydrofuran being merely illustrative of organic solvents which are adequately fluid at the preferred reaction temperatures between $-30°$ C. and room temperature. The reaction proceeds only very slowly at temperatures lower than $-30°$ C., and the rate of decomposition of AOC-Cl increases significantly as the temperature is raised above $10°$ C. The reaction is performed most economically at temperatures between $-5°$ and $-20°$ C. A hydrogen chloride acceptor is necessary for high yields. Many tertiary amines are suitable for the purpose and triethylamine is most readily available. Other conventional hydrogen chloride acceptors, however, are equally effective. Water should be excluded from the reaction mixture because of its hydrolyzing effect on AOC-Cl. The yield of the N-acylation reaction with AOC-Cl is normally 100%, and the acylated ester dissolves in the reaction medium.

The AOC-amino acid esters obtained may be reacted with other amino acids to form peptides, whereupon the AOC-group may be removed quickly by treatment with hydrogen chloride dissolved in methanol or in glacial acetic acid. This reaction can be performed at low temperature without forming unwanted byproducts. It is fully applicable to peptides containing thioether linkages, as in methionine, which tend to poison the catalyst required for the removal of carbobenzoxy radicals by hydrogenation, and which are reduced by metallic sodium in liquid ammonia. The molecular weight of long-chain peptides is not affected by the simple methods available for removal of the AOC-groups. Simultaneously present N-benzyl groups are also unaffected.

The following examples are further illustrative of the manner of preparing and using tert-amyl chloroformate (tert-amylcarbonyl chloride, AOC-Cl) in the preparation of intermediates for peptide synthesis.

Example 1

100 g. phosgene were dissolved in a mixture of 46 g. tert-amyl alcohol and 500 ml. dry ether. A solution of 41 g. pyridine in 500 ml. dry ether was added drop by drop while the temperature was held below $-40°$ C., and the reaction mixture was then kept several hours at $-20°$ C., whereupon a precipitate of pyridine hydrochloride was removed by filtration. Ether and other volatile materials were evaporated from the filtrate in a vacuum and about 120 ml. of a colorless liquid were obtained.

The liquid contained about 45 g. of tert-amyl chloroformate of the formula

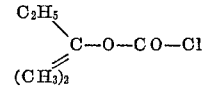

and was used as tert-amyl chloroformate reagent in the procedures described below. Purification was unnecessary.

Example 2

2.8 g. ethyl aminoacetate hydrocloride and 3 ml. triethylamine were dissolved in 40 ml. chloroform. The solution was kept at $-10°$ C. while 8 ml. tert-amyl chloroformate reagent and 3 ml. triethylamine were added in alternating small batches of one third of each. When the reaction had been completed, the reaction mixture was washed in sequence with water, 0.5 N hydrochloric acid and 5% aqueous sodium bicarbonate solution, and then dried.

Evaporation of the anhydrous solution left a colorless, viscous residue of the ethyl ester of AOC-glycine. The yield was 96%. The ester was dissolved in 40 ml. acetone, and saponified in a conventional manner with N NaOH. Crystalline AOC-glycine of M.P. $82.5-84°$ C. was obtained in a yield of 82%.

Example 3

A solution was prepared from 24.2 g. L-proline benzyl ester hydrochloride, 14 ml. triethylamine and 300 ml. chloroform. 40 ml. tert-amyl chloroformate reagent and 15 ml. triethylamine were added in alternating small batches to the solution which was kept at $-10°$ C. When the reaction mixture was worked up as in Example 2, the benzyl ester of AOC-proline was obtained as a syrupy liquid in practically 100% yield. The syrupy product was subjected to catalytic hydrogenolysis in methanol solution in the presence of palladium black. Crystalline AOC-L-proline having a melting point of $94-95.5°$ C. was obtained in a yield of 90%. $[\alpha]_D^{21} = -47.2$ (c.=1.7, ethanol).

The following Table 1 lists other AOC-amino acids which were prepared by the method described in Examples 2 and 3. Many of the AOC-amino acid esters prepared could not be crystallized and were converted to the free acids. The lower alkyl esters were saponified, and the benzyl and p-nitrobenzyl esters were decomposed by catalytic hydrogenation. The yields listed in Table 1 are based on the amino acid esters employed. Those AOC-amino acids which were obtained as viscous liquids were converted to crystalline derivatives whose characteristic properties are listed in Table 2. The listed p-nitrophenyl esters were prepared from the free AOC-amino acids by a method illustrated in Example 4. The yields listed in Table 2 are based on the amount of free AOC-amino acid reacted.

Example 4

4.1 g. dry AOC-L-leucine and 2.2 g. p-nitrophenol were dissolved in 20 ml. ethyl acetate, and 3.3 g. dicyclohexylcarbodiimide were added to the solution with cooling, and the resulting mixture was kept at $-50°$ C. for one hour, and thereafter at room temperature for two additional hours. The crystals formed were removed by filtration, and the mother liquor was concentrated to a syrup which was crystallized from a mixture of 5 ml. ether and 20 ml. petroleum ether at $-20°$ C., and recrystallized from the same solvent mixture. The purified crystals had a melting point of $59-61°$ C., and weighed 4.9 g. (79% yield). The ester is very reactive and readily forms peptides with other amino compounds.

The listed p-nitrophenyl esters of the various amino acids were prepared in an analogous manner, and the dicyclohexylamine salts were prepared from equivalent amounts of the base and of the amino acid.

TABLE 1.—AOC-AMINO ACIDS

| AOC-derivative of— | Ester group employed in the preparation | M.P., °C. | Yield, percent | $[\alpha]_D^{21}$ (c in EtOH) |
|---|---|---|---|---|
| L-alanine | Benzyl | Oil | 91 | |
| L-isoleucine | Methyl | Oil | 73 | |
|  | Benzyl | Oil | 100 | |
| L-leucine (monhydrate) | Ethyl | 61–63 | 79 | −18.6° (1.9) |
| L-lysine (α,Σ-diAOC) | Benzyl | Oil | 96 | |
| L-methionine | Methyl | Oil | 76 | |
| γ-Methyl-L-glutamate | α-p-nitrobenzyl | Oil [1] | 80 | |
| β-Methyl-L-aspartate | do | Oil | 72 | |
| δ-Carbobenzoxy-L-ornithine | Methyl | Oil | 87 | |
| L-phenylalanine | Ethyl | Oil | 97 | |
| D-phenylalanine | Methyl | Oil | 93 | |
| L-serine | do | Oil | 98 | |
| L-tryptophan | do | 121–123 | 86 | +7.1° (1.2) |
| L-tyrosine | do | Oil | 67 | |
| L-valine | Ethyl | Oil | 69 | |
|  | Benzyl | Oil | 94 | |
| α-Carbobenzoxy-L-lysine | Methyl | Oil | 98 | |

[1] AOC-α-p-nitrobenzyl-γ-methyl-L-glutamate is crystalline. M.P. 66–67° C., yield 80%.

TABLE 2.—CRYSTALLINE DERIVATIVES OF AOC-AMINO ACIDS

| Crystalline derivatives | M.P., °C. | Yield, percent | $[\alpha]_D^{21}$ (c in EtOH) |
|---|---|---|---|
| (1) Dicyclohexylamine salt of AOC-derivative of— | | | |
| L-alanine | 124–126 | 78 | [1] +4.7° (2.4) |
| L-isoleucine | 101.5–102 | 71 | [1] +3.9° (1.6) |
| L-methionine | 105–107 | 75 | +17.4° (1.3) |
| L-phenylalanine | 198–199 | 85 | +27.4° (0.79) |
| L-tyrosine | 203–204 | 78 | [1] +44.3° (1.0) |
| L-valine | 119–121.5 | 79 | +2.0° (1.7) |
| γ-Methyl-L-glutamate | 133–134 | 70 | [2] +13.5° (1.97) |
| β-Methyl-L-aspartate | 123–124 | 85 | [2] +19.4° (1.93) |
| α-Carbobenzoxy-L-lysine | 126–127 | 80 | [1] +5.54° (3.1) |
| (2) p-Nitrophenyl ester of AOC-derivative of— | | | |
| L-leucine | 59–61 | 79 | −49.3° (1.3) |
| L-lysine (α, ε-diAOC-) | 65–68 | 46 | −25.2° (1.8) |
| δ-Carbobenzoxy-L-ornithine | 110–112 | 50 | [3] −27.5° (2.3) |
| L-phenylalanine | 128–129 | 83 | −14.6° (1.3) |
| D-phenylalanine | 128–128.5 | 81 | +15.4° (1.0) |

[1] $[\alpha]_D^{22}$. [2] $[\alpha]_D^{20}$. [3] $[\alpha]_D^{24}$.

Example 5

40 ml. tert-amyl chloroformate reagent and 17 ml. triethylamine were added in alternating small batches to a solution of 15.6 g. L-serine methyl ester hydrochloride and 14 ml. triethylamine in 350 ml. chloroform. The mixture was worked up as in Example 2, and AOC-L-serine methyl ester was obtained as a viscous liquid in practically 100% yield.

The ester obtained was dissolved in 70 ml. ethanol, and 15 g. 80% hydrazine hydrate were added to the solution which was then stored for 24 hours. It was then evaporated to dryness in a vacuum. The residue of 20.8 g. crystalline AOC-L-serine hydrazide was recrystallized from ethyl acetate. The needle shaped crystals obtained weighed 18.5 g. (82% yield). M.P. 98–100° C. $[\alpha]_D^{21}=$ −5.0° (c.=1.0, ethanol).

Example 6

2.56 grams of the p-nitrophenyl ester of AOC-L-leucine, 1.39 g. of the L-methionine methyl ester hydrochloride, and 1.1 ml. triethylamine were mixed with 25 ml. dimethylformamide and permitted to react for 12 hours. When 120 ml. water were added, an oil was precipitated and was extracted twice with 80 ml. batches of ethyl acetate. The combined extracts were washed with N aqueous ammonia, water and 0.5 N hydrochloric acid, and dried. The ethyl acetate was distilled off, and the residue of AQC-L-leucyl-L-methionine methyl ester was recrystallized from ethyl acetate and petroleum ether. The recrystallized product had a melting point of 92–93° C. and weighed 2.73 g.

Example 7

5.2 g. AOC-L-leucyl-L-methionine-methyl ester prepared as in Example 6 were dissolved in 100 ml. of methanol, and the solution was saturated with ammonia at 0° C. It was stored for one day and was then evaporated to dryness in a vacuum. The residue was dissolved in a 2-N solution of HCl in methanol which was held for 50 minutes, and was then evaporated to dryness. The residue of L-leucyl-L-methionine amide hydrochloride was recrystallized from a mixture of methanol and ethyl acetate. The purified compound crystallized in hexagonal plates of M.P. 192–193° C., weighing 3.34 g.

If refrigeration is not available or not convenient for the reaction between an amino acid ester and a reagent which introduces the N-tert-amyloxycarbonyl radical, or if such a radical is to be introduced directly into a free amino acid, I prefer to convert AOC-Cl into the corresponding azide in a two-step reaction with hydrazine and nitrous acid. The azide is stable at ordinary room temperature, may be stored over long periods and used without refrigeration. It reacts not only with the esters of amino acids but also with the free acids themselves, and the corresponding AOC derivatives can be prepared in aqueous alkaline media at ambient or elevated temperatures.

It is known to produce tert-butoxycarbonyl azide from the corresponding hydrazide by reaction with nitrous acid. However, the hydrazide cannot be produced directly from the unstable tert-butyloxycarbonyl chloride, and the indirect methods of synthesis from tert-butanol are not only relatively complex but their yield is low. The overall yield of AOC-azide from tert-amyl alcohol is between 60 and 70 percent when the alcohol is reacted with phosgene, the AOC-Cl obtained is reacted with hydrazine, and the hydrazide is further reacted with nitrous acid. The reaction between the AOC-Cl and hydrazine can be performed successfully at temperatures as high as 0° C.

The tert-amyloxycarbonyl azide differs in stability from the homologous tert-butanol derivative as the chlorides do. Whereas tert-butoxycarbonyl azide is explosive, and explosions have occurred while the reagent was being produced, extensive work with tert-amyloxycarbonyl azide has not caused a single explosion. Large amounts of the compound have been prepared safely in one batch, and have been stored at ambient temperature over extended periods without mishap.

AOC-azide readily reacts with amino acids in slightly alkaline aqueous media at room temperature or at slightly elevated temperatures. Inert hydrophilic organic solvents may be present during the reaction, acetonitrile, acetone, dimethylformamide, dioxane, and tetrahydrofuran being typical of such solvents. The alkalinizing agent may be magnesium oxide, sodium bicarbonate or an organic base, such as triethylamine.

The amino acids whose amino or imino groups have been successfully protected by means of AOC-azide include the monoaminocarboxylic acids, monoaminodicarboxylic acids, diaminomonocarboxylic acids, diaminodicarboxylic acids, and amino acids having a protected third functional group, such as a carboxyl group, hydroxyl group or thiol group. AOC-azide also has been reacted successfully with diaminocarboxylic acids in which one amino group was protected by a radical other than AOC, and with peptides composed of the aforementioned amino acids. The imino groups of proline, hydroxyproline and the like are readily protected by AOC groups introduced by means of AOC-azide.

The amino acid esters disclosed above as capable of reacting with AOC-Cl may be provided with N-AOC-groups by reaction with AOC-azide in an analogous manner. No amino acid esters having a free amino or imino group have been found that could not be protected by either AOC-Cl or AOC-$N_3$, but the lower alkyl, benzyl and p-nitrobenzyl esters are of greatest interest for peptide chemists at this time for the reasons mentioned above.

The following examples further illustrate the preparation and use of tert-amyloxycarbonyl azide having the formula

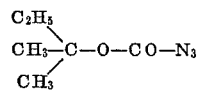

Example 8

480 ml. of a 35% solution of phosgene in toluene were mixed with 1400 ml. dry ether, and the mixture was cooled to a temperature between −40° and −50° under anhydrous conditions. A solution of 88 g. tert-amyl alcohol and 79 g. pyridine in 400 ml. dry ether was added to the phosgene solution drop by drop with stirring. Stirring was continued for one hour at −40° C. after all the phosgene had been added, and the mixture was then held at −20° C. overnight. The precipitated pyridine hydrochloride was filtered off, and the filtrate was evaporated to about 525 ml. in a vacuum. The toluene bearing concentrate was employed as "AOC-chloride solution" in the following example.

Example 9

50 g. anhydrous hydrazine were suspended in 150 ml. ether at 0° C., and 195 ml. AOC-chloride solution were added slowly with stirring. Stirring was continued for one hour after the addition had been completed, 100 ml. 2 N sodium hydroxide solution were added, and the mixture was extracted with ether. The ether extract was dried and then evaporated. The oily residue was fractionated in a vacuum, and 35.0 g. AOC-hydrazide were obtained as a fraction boiling at 87° C. at 5 mm. Hg. The yield was 65% on the basis of the tert-amyl alcohol used. The composition of the compound was consistent with the formula $C_6H_{14}O_2N_2$.

Calculated: C, 49.30%; H, 9.65%; N, 19.17%. Found: C, 49.23%; H, 9.81%; N, 18.75.

Example 10

17.5 g. AOC-hydrazide, prepared as in Example 9, were dissolved in a mixture of 60 ml. acetic acid and 40 ml. water, and 10.7 g. sodium nitrite were added gradually to the solution which was kept at −5° C. Stirring was continued for 30 minutes after the addition was completed, and 200 ml. 5% aqueous sodium bicarbonate solution and 150 ml. ether were then added with stirring. The pH was adjusted to 8 with sodium bicarbonate solution, and the precipitate formed was removed by filtration. The filtrate was extracted with ether, and the ether extract was washed with water and dried over anhydrous magnesium sulfate.

The solvent was evaporated, and the oily residue was fractionated in a vacuum. 17.4 g. AOC-azide were obtained as a fraction boiling at 87° C. at 65 mm. Hg (92.5% yield).

Calculated for $C_6H_{11}O_2N_3$: C, 45.85%; H, 7.05%. Found: C, 45.50%; H, 7.30%.

Example 11

A solution of 1.9 g. AOC-azide in 15 ml. dioxane was added with stirring to a suspension of 0.75 g. glycerine and 0.8 g. magnesium oxide in 15 ml. water. The mixture was stirred overnight at 40° C. The dioxane was removed from the mixture which had a pH of 8 by distillation, the pH of the residue was adjusted to 1–2 by addition of N hydrochloric acid, and the acidified mixture was extracted with ethyl acetate.

The extract was dried over anhydrous sodium sulfate and evaporated. 1.4 g. crystalline AOC-glycine of melting point 82° C. was obtained (74.2% yield). The compound was identified by elementary analysis.

Calculated for $C_8H_{15}O_4N$: C, 50.78%; H, 7.99%; N, 7.40%. Found: C, 50.91%; H, 8.10%; N, 7.42%.

Example 12

When 1.15 g. L-proline were reacted with 1.9 g. AOC-azide in the manner of Example 11, 1.9 g. AOC-L-proline (83% yield) were obtained. M.P. 96° C. $[\alpha]_D^{18}=-47.0°$ (c. 1.7, ethanol).

Calculated for $C_{11}H_{19}O_4N$: C, 57.62%; H, 8.35%; N, 6.11%. Found: C, 57.57%; H, 8.21%; N, 5.97%.

Example 13

A solution of 3.1 g. AOC-azide in 15 ml. dioxane was added to a suspension of 2.9 g. L-glutamine and 3.67 ml. triethylamine in 25 ml. water, and the reaction mixture was kept at room temperature for four days. The dioxane was removed by vacuum distillation, and the aqueous residue was adjusted to pH 2 with N hydrochloric acid. It was extracted with ethyl acetate, and the solvent extract was dried over anhydrous sodium sulfate and evaporated. Crystallization of the residue was induced by adding ether, and 2.1 g. crystalline AOC-L-glutamine were obtained (40.0% yield). M.P. 117–119° C. (decomp.), $[\alpha]_D^{27}=-19.3°$ (c. 5, dimethylformamide).

Calculated for $C_{11}H_{20}O_5N_2$: C, 50.75%; H, 7.75%; N, 10.76%. Found: C, 51.07%; H, 7.88%; N, 10.58%.

What is claimed is:

1. A method of protecting an amino or imino group in a lower alkyl, benzyl, or p-nitrobenzyl ester of an amino acid which comprises reacting said ester with tert-amyloxycarbonyl chloride in an inert liquid medium at a temperature between −30° C. and room temperature, until an N-tert-amyloxycarbonyl derivative of said ester is formed.

2. A method as set forth in claim 1, wherein said derivative is reacted with hydrazine in a liquid medium until the acyl hydrazide of the corresponding N-tert-amyloxycarbonyl amino acid is formed.

3. A method as set forth in claim 1, wherein said ester is reacted with said tert-amyloxycarbonyl chloride at a temperature between −30° C. and 10° C. in an anhydrous, liquid, inert organic solvent in the presence of an acceptor for hydrogen chloride.

4. A method as set forth in claim 3 wherein said amino acid is selected from the group consisting of glycine, alanine, valine, leucine, isoleucine, phenylalanine, tyrosine, proline, hydroxyproline, serine, methionine, tryptophan, glutamic acid, aspartic acid, lysine, sarcosine, O-benzylserine, O-t-butylthreonine, nitroarginine, $N_{Im}$-benzylhistidine, S-benzylcysteine, S-methoxybenzylcystin, δ-carbobenzoxyornithine, and α-carbobenzoxylysine.

5. Tert-amyloxycarbonyl azide.

6. A method of preparing tert-amyloxycarbonyl azide which comprises:
   (a) reacting tert-amyl alcohol with phosgene in a liquid medium at a temperature not substantially exceeding −20° C. in the presence of an acceptor for hydrogen chloride until tert-amyloxycarbonyl chloride is formed;
   (b) reacting said tert-amyloxycarbonyl chloride in a liquid medium with hydrazine at about 0° C. under anhydrous conditions to form tert-amyloxycarbonyl hydrazide; and
   (c) reacting said hydrazide with nitrous acid to tert-amyloxycarbonyl azide.

References Cited

UNITED STATES PATENTS

| | | | |
|---|---|---|---|
| 2,917,502 | 12/1959 | Schwyzer et al. | 260—112 |
| 3,078,301 | 2/1963 | Taub | 260—482 |
| 3,264,279 | 8/1966 | Schwyzer et al. | 260—112.5 |

OTHER REFERENCES

Prosser et al.: Chem. Abs. 61: 13164 (November 1964).
Farthing: Chem. Abs. 45: 6579 (September 1951).
Fieser et al.: Adv. Org. Chem. (Reinhold, N.Y., 1962), pages 501–2.
Morrison et al.: Organic Chemistry (Allyn & Bacon, Boston 1959), page 692.

HENRY R. JILES, *Primary Examiner*.

C. M. SHURKO, *Assistant Examiner*.

U.S. Cl. X.R.

260—309, 326.3, 326.14, 349, 463, 470, 471, 481, 482, 487, 515, 516, 518, 519, 534, 558, 559, 561